United States Patent [19]

Griller et al.

[11] Patent Number: 5,178,091
[45] Date of Patent: Jan. 12, 1993

[54] PRODUCT AND METHOD FOR DETECTING A LOW LEVEL OF LIQUID IN A LIQUID RESERVOIR

[76] Inventors: David Griller, 2026 Delmar Court, Ottawa, Ontario, Canada, K1H 5R6; Robert Gould, 1933 Camborne Crescent, Ottawa, Ontario, Canada, K1H 7B6

[21] Appl. No.: 589,499

[22] Filed: Sep. 28, 1990

[30] Foreign Application Priority Data

Sep. 29, 1989 [CA] Canada .................................. 614694

[51] Int. Cl.⁵ .............................................. G08B 5/00
[52] U.S. Cl. ....................................... 116/201; 116/1; 222/23
[58] Field of Search .................... 116/1, 200, 201, 227, 116/DIG. 1; 222/23; 239/71, 74; 252/70

[56] References Cited

U.S. PATENT DOCUMENTS

| | | | |
|---|---|---|---|
| 2,636,644 | 4/1953 | Taylor | 222/23 X |
| 3,245,912 | 4/1966 | White | 252/70 |
| 3,989,633 | 11/1976 | Frisque | 252/79 X |
| 4,152,306 | 5/1979 | DeMatteo, Jr. | 252/70 X |
| 4,380,772 | 4/1983 | Italiano | 116/227 X |

Primary Examiner—William A. Cuchlinski, Jr.
Assistant Examiner—W. Morris Worth
Attorney, Agent, or Firm—Fisher, Christen & Sabol

[57] ABSTRACT

This invention relates to a novel means for detecting a low level of liquid in a reservoir. One application for the invention is to provide a way to indicate when the level of windshield washer fluid for a vehicle is at a low level. According to one of its broad aspects, the windshield washer fluid noticeable changes color on the windshield, when it is running low in the reservoir; for example, changing from very light blue to an intense red. There are known electrical and mechanical means for indicating the level of a fluid in a reservoir. However, these indicators of fluid level rely on special equipment such as floats and electrical contacts. An advantage of the present invention, is that it can be used with existing windshield washer reservoirs without the need for additional equipment and/or gauges in the interior of the vehicle. According to one aspect of this invention, the windshield washer reservoir contains a first liquid which usually would be ordinary windshield washer fluid, normally of a light blue or light green color and normally comprising a mixture of water, methyl alcohol and a dye. Added to this first liquid in the reservoir is a second liquid having a specific gravity different from and floating on top of the first liquid such that when the first liquid is exhausted, the windshield washer delivery system will then pump, on to the windshield, the second liquid. This provides an advance warning the windshield fluid is running low; however the second liquid will continue to be available to clean the windshield for as long as previously planned. The second liquid has a color that is noticeably different from that of the first liquid so that it is apparent the first liquid has been consumed. Hexyl alcohol is one example of a second liquid that is relatively immiscible with, and works well with ordinary windshield washer fluid as a first liquid. The hexyl alcohol based second liquid can be colored bright red, for example, with a dye that is relatively insoluble in the ordinary windshield washer fluid.

19 Claims, 2 Drawing Sheets

PRODUCT AND METHOD FOR DETECTING A LOW LEVEL OF LIQUID IN A LIQUID RESERVOIR

DISCLOSURE

This invention relates to a novel means for detecting a low level of liquid in a reservoir. One application for the invention is to provide a means of indicating when the level of windshield washer fluid in a vehicle is at a low level.

BACKGROUND

There are known electrical and mechanical means for indicating the level of a fluid in a reservoir. As an example, the fuel gauge in an automobile relies on one or both of these known mechanical or electrical means. However, these indicators of fluid level rely on special equipment such as floats and electrical contacts. An advantage of the present invention, is that it can be used with existing windshield washer reservoirs without the need, according to the broad aspects of this invention, for additional equipment and/or gauges in the interior of the vehicle.

It is particularly advantageous to know when windshield washer fluid, is running low in a windshield washer reservoir. If the fluid is not replenished and runs out, the results can be serious in that dirt on the windshield can be smeared making visibility extremely poor. According to the vast majority of current windshield washer delivery systems, there is no advance warning that the windshield washer liquid is running low.

According to the present invention, the user is given as much advance warning as is required prior to exhaustion of the fluid and following such warning, it is still possible to adequately wash the windows.

SUMMARY OF THE INVENTION

This invention relates to a method of detecting a threshold minimum amount of windshield washer fluid in a windshield washer reservoir comprising combining a first windshield washer fluid having a first color with an indicator means whereby when said liquid in a reservoir is at its threshold minimum, said indicator means causes the windshield washer fluid to change from said first color to a second color.

This invention further relates to a windshield washer fluid comprising a liquid that is of a lower specific gravity than conventional water and alcohol based windshield washer liquid.

As well, this invention relates to a windshield washer comprising a vessel for holding windshield washer fluid and means for delivering to said windshield a first liquid, and when said first liquid is substantially exhausted, a second liquid having noticeably different properties from said first liquid.

DESCRIPTION OF THE INVENTION

In a preferred embodiment of this invention, the windshield washer reservoir contains a first liquid which usually would be ordinary windshield washer fluid, normally of a light blue or light green color and normally comprising a mixture of water and methyl alcohol. Added to this first liquid in the reservoir is a second liquid having a specific gravity different from the first liquid such that when the first liquid is exhausted, the windshield washer delivery system will then pump, on to the windshield, the second liquid.

Preferably the second liquid is at least partially immiscible with the first liquid.

The second liquid can have a color that is different from and/or far more intense than that of the first liquid so that it is apparent that the first liquid has been consumed. Thus, the second liquid should have an intrinsic color of its own or should contain a suitable colorant. Alternatively, the first liquid can be colored and the second liquid clear in color.

A preferred color is a bright shade of red which is readily noticeable as it leaves the windshield washer jet and first impacts on the windshield.

In operation, according to a preferred feature of the invention, the second liquid will have a specific gravity lower than that of the first liquid and will be, at least partially, immiscible with the first liquid so that it will normally float on top of the first liquid. In a standard windshield washer delivery system, the pump draws liquid from the bottom of the windshield washer reservoir and thus would pump out the first liquid having a higher specific gravity. When this liquid is exhausted the pump would then draw out the second liquid having the lower specific gravity which, in normal operation of the vehicle, would float above the first liquid.

According to the preferred features of this invention one also chooses first and second liquids that are compatible with vehicle glass and vehicle finishes and paint. Examples of liquids meeting the above-mentioned specifications are ordinary windshield washer fluid usually containing water or water and methyl alcohol as mentioned above, as a first liquid, and an alcohol such as hexyl alcohol that is not completely miscible with the first liquid and which forms a second liquid layer above the ordinary windshield washer fluid. Other examples for a second liquid, when the first fluid is ordinary water/methyl alcohol based windshield washer fluid are fluids which are oil based or oily in nature and would float above the ordinary windshield washer fluid. Further examples are alcohols such as pentyl alcohol, octyl alcohol, heptyl alcohol and isomers of such alcohols.

In selecting the fluids for specific applications, attention will be paid to the toxicity of the fluids chosen and the ignition temperatures of such fluids. In addition, attention will be paid to the freezing points, boiling points and vapor pressures of the liquids chosen, since these will be relevant to the climatic conditions in regions where the product is used and to losses of the product due to evaporation.

Attention can also be paid to the compatibility of the fluids with the plastic windshield washer reservoir normally found in a vehicle and the tubing and the like used to deliver such fluid to the vehicle windshield.

A preferred second liquid used in conjunction with a first liquid being ordinary water/methyl alcohol based windshield washer fluid is hexyl alcohol which possesses a number of the desired properties indicated above. For example, hexyl alcohol is used in the manufacture of perfumes and as well as a plasticizer and synthetic lubricating oil. Accordingly, the toxicity is within acceptable limits. The ignition temperature of hexyl alcohol is 293° C., which again is amenable to use in an automobile windshield washer delivery system.

A further preferred feature to be considered when selecting windshield washer fluids is the biodegradibility and pollution factors attaching to the liquids. Again, hexyl alcohol is particularly well suited.

In a preferred embodiment, the novel windshield washer of this invention has a second fluid colored by a dye that is soluble in said second fluid and generally insoluble in said first fluid.

Hexyl alcohol is a colorless transparent liquid and as such it can be colored to be given a color markedly different from the ordinary light blue or light green of standard windshield washer fluid. A preferred feature to look for in selecting a dye is that it be soluble in alcohol and less soluble in water, to avoid co-mingling with the first fluid. A variety of dyes meeting these specifications are available from dye manufacturers such as Dyeco Limited; one is DEC red #17*.
*Trade-mark Since hexyl alcohol is colorless, another means for accomplishing the results of this invention is to for example color the ordinary water/methyl alcohol solution with a dye such as an intense food dye and leave the upper hexyl alcohol layer colorless. Thus, when the fluid impacting on the windshield turns colorless, one knows the level of fluid is low.

Having read the foregoing, the selection of other liquids having the preferred features referred to above can be identified. These could comprise, for example, other organic compounds such as ketones, aldehydes, acids or acetates and isomers thereof having specific gravities different from that of the first windshield washer liquid such that the organic liquids, according to the preferred feature of the invention, would float above the windshield washer fluid in the reservoir.

Alternatively, finely divided solids or liquids are suspended in a first liquid and float in the top regions of said first liquid to act as indicators. A preferred property of these fine materials is that they have a specific gravity less than that of the first liquid in which they are suspended. Accordingly they would be suspended in the uppermost region of the first liquid. These materials would serve as indicators since they would alter the color or opacity of the liquid being delivered to the windshield. Under these circumstances a second liquid would not necessarily be required or when a second lighter liquid is used, the fine materials are suspended in the second liquid to enhance the visibility of the second liquid.

BRIEF DESCRIPTION OF THE DRAWINGS

The operation of the windshield washer fluid delivery system, according to this invention, can be better understood by reference to FIGS. 1 through 5 of the accompanying drawings.

In FIG. 4 the first liquid is present in sufficient quantity and in FIG. 5 the first liquid is substantially exhausted.

DETAILED DESCRIPTION OF THE DRAWINGS

Figure 1:
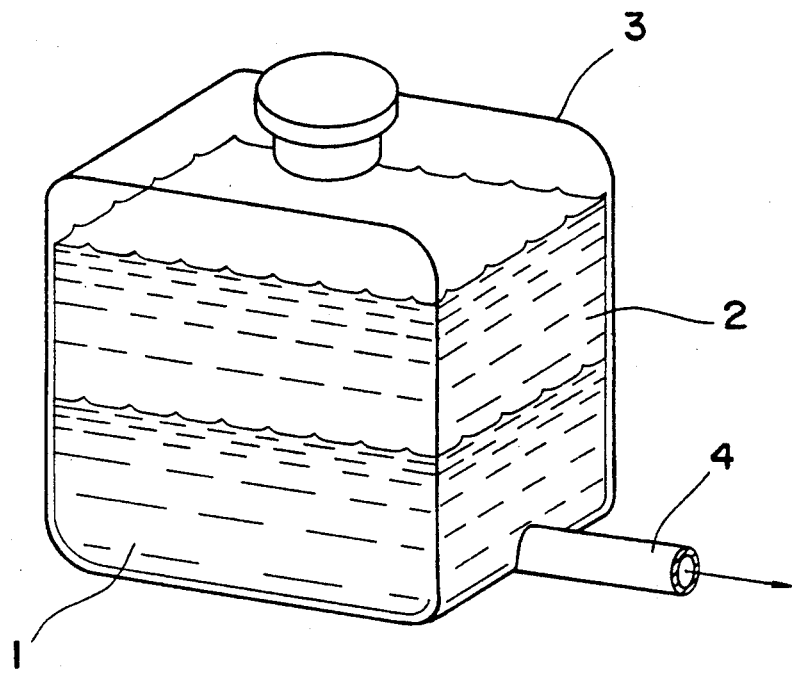
FIG. 1 is a perspective view of a windshield washer reservoir and a portion of the delivery system.

In FIG. 1, the reservoir 3 when it is full or partially full contains two windshield washer liquids identified respectively as 1 and 2. Liquid 2 has a lower specific gravity than liquid 1 and thus floats on top of liquid 1. In the normal delivery system the fluid is pumped from the bottom of the reservoir through tube 4. Once liquid 1 is exhausted from the reservoir, liquid 2 will then be pumped through tube 4 and being a color markedly different from liquid 1, it will be recognized when it impacts on the windshield. The second liquid will be best recognized immediately on its ejection from the windshield washer jets and upon impact onto the windshield and as well when it collects on the sides of the window. In order to ensure that visibility continues to be good at all times, the windshield washer fluid 2 will be an effective windshield cleaning agent. This second fluid is best recognized immediately upon ejection from the jets or impact on to the windshield and before it is spread out.

Figure 2:
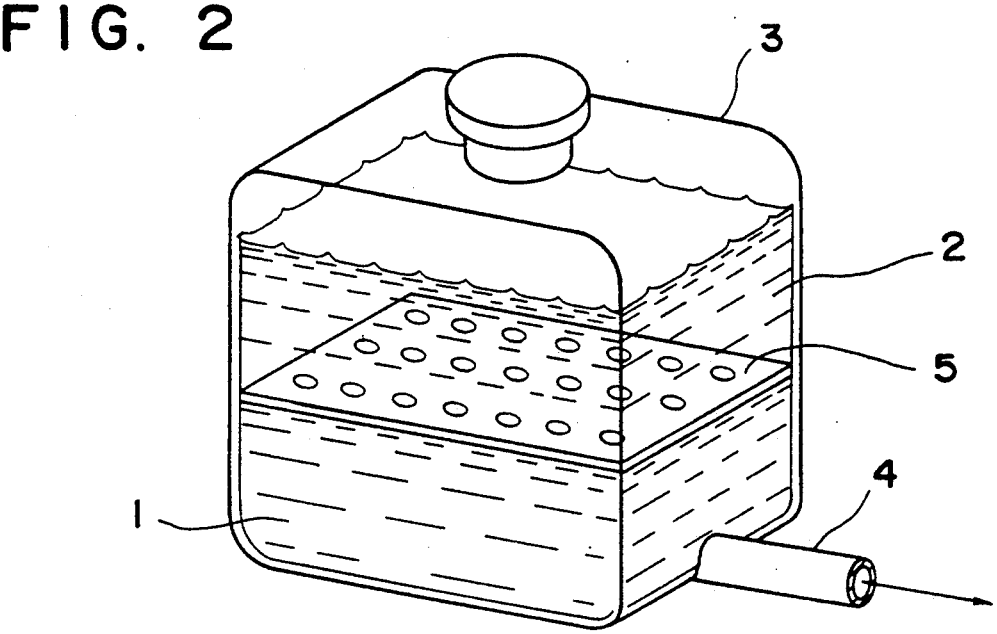
FIG. 2 is a perspective drawing of a baffle which can be placed in said reservoir.

FIG. 2 shows a baffle 5 which can be inserted in the reservoir which can float in the reservoir at the junction of the two liquids 1 and 2, thus minimizing co-mingling of the liquids.

Where one does not want to rely entirely on the difference in specific gravities between two liquids, another aspect of the invention includes the addition of mechanical means to assist in separating the liquids. Such mechanical means can include a membrane between the two liquids.

Figure 3:
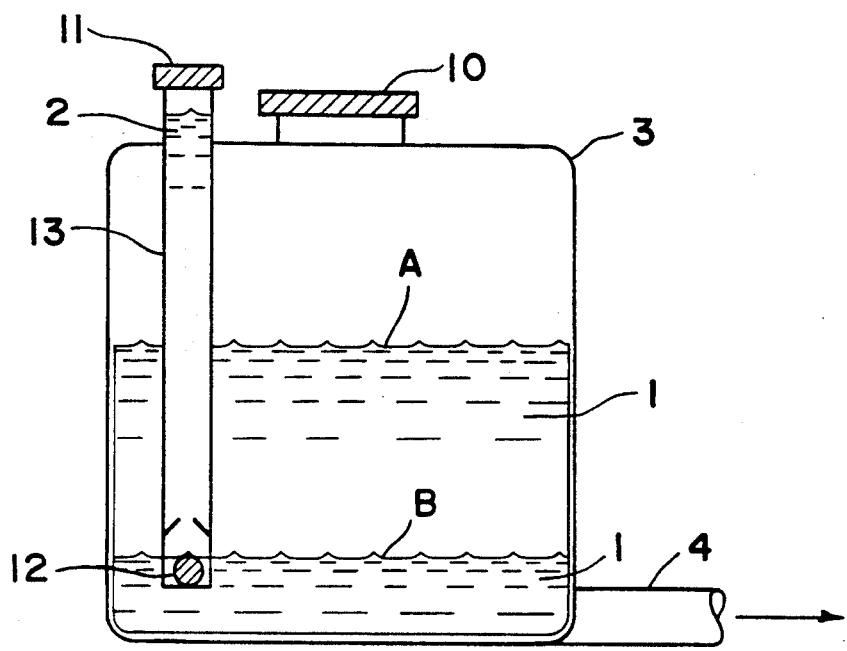
FIG. 3 shows in cross-section another embodiment of the invention in which the second windshield washer fluid is kept in its own separate reservoir.
Figure 4:
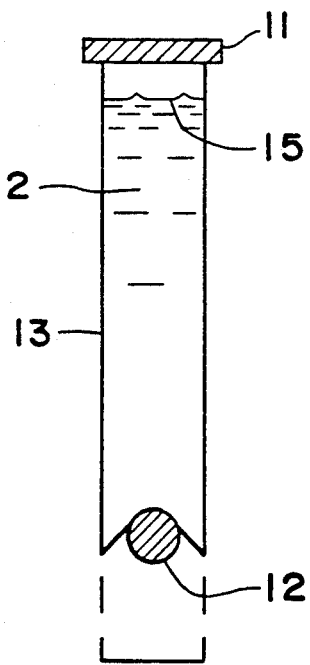
FIGS. 4 and 5 show in cross-section the separate reservoir for the separate liquid.
Figure 5:
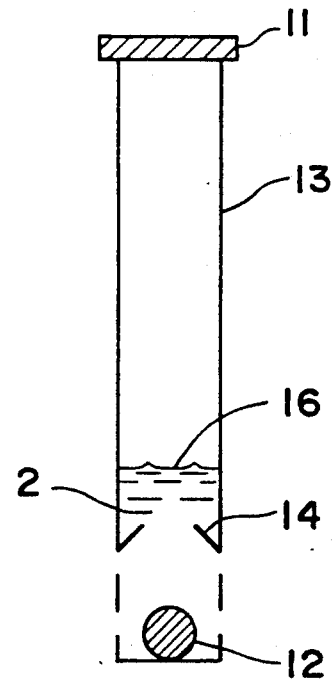

FIGS. 3, 4 and 5 show another embodiment of the invention where the second liquid 2 is different from the first liquid 1 in terms of its color. However, the properties of liquids 1 and 2 can be similar to each other. Windshield washer liquid 1 is used in the main reservoir 3 and is introduced through filler cap 10. Windshield washer fluid 2 is kept in its own reservoir 13 and is introduced into reservoir 13 through filler cap 11. There is a flotation device at the bottom of reservoir 13 such that when windshield washer fluid 1 is at a sufficient level for example A, the flotation device keeps reservoir 13 closed at its bottom end such that the second liquid 2 is not introduced into the main reservoir. However, when the windshield washer fluid 1 is substantially exhausted, such that it is at level B in the main reservoir, the flotation device 12 will fall, (i.e., no longer be buoyed up by liquid) thus permitting the exit of the second fluid 2 into the principle reservoir. The second fluid will have a color substantially more intense than the first liquid and thus the windshield washer fluid exiting through tube 4 onto the windshield will change to the intense color, notifying the driver that the level of windshield washer liquid 1 in the main reservoir is below its threshold minimum.

As well, one does not have to rely on the difference in colors in the reservoir of the two liquids. One can choose liquids which on contact with a suitable indicating device on, or near, the windshield will indicate to the driver of the vehicle that the second fluid is being used and that therefore the level of liquid in the reservoir is running low. Any means which would permit a driver to identify that a second liquid is being distributed on to the automobile windshield will function according to this invention. A further example is the presence of an indicator means in the liquid reservoir which, when the liquid in the reservoir decreases to a threshold minimum, causes the indicator means to be present in high enough concentration to cause a change in coloration of the liquid.

Alternatively, a characteristic smell or a characteristic wetting ability of the second liquid, that is distinct from the analogous properties of the first liquid, can also serve as a suitable indicator.

As will be apparent, many widely different embodiments of the invention may be made without departing from the spirit and scope thereon and it is to be understood that the invention is not limited to the specific embodiments.

What we claim as our invention is:

1. A method of indicating a threshold minimum amount of windshield washer fluid in a windshield washer reservoir comprising
   a) introducing both a first windshield washer liquid and a second windshield washer liquid having a noticeably different color from said first windshield washer liquid into the windshield washer reservoir wherein the second liquid has a specific gravity different from said first liquid, and
   b) monitoring delivery of windshield washer fluid upon a windshield during operation of a windshield washer delivery system so as to visually detect the different color of the second liquid on the windshield, whereby visual detection of the second liquid indicates that the minimum amount of windshield washer fluid remains in the windshield washer reservoir.

2. A method as claimed in claim 1 wherein said first and second windshield washer liquids are relatively immiscible.

3. A method as claimed in claim 1 wherein said first liquid is conventional water or water and alcohol based windshield washer fluid and said second liquid is an organic liquid of lower specific gravity that is not completely miscible with the conventional windshield washer liquid.

4. A method as claimed in claim 1 wherein said second windshield washer liquid is colored by a dye that is generally soluble in said second liquid and generally insoluble in said first liquid.

5. A method as claimed in claim 1 wherein said second liquid is poured into said reservoir with said reservoir already containing said first liquid.

6. A method as claimed in claim 1 wherein means are inserted in said reservoir to minimize intermixing of said first and second liquids.

7. A method as claimed in claim 6 wherein a baffle or membrane is inserted in said reservoir at the juncture of said first and second liquids, to minimize intermixing of said liquids.

8. A method as claimed in claim 1 wherein said second liquid is colorless.

9. A method as claimed in claim 1 wherein said second liquid is compatible with glass and automobile parts when functioning as a windshield washer.

10. A method as claimed in claim 4 wherein said second windshield washer liquid comprises hexyl alcohol.

11. A method as claimed in claim 4 wherein said second windshield washer liquid comprises pentyl alcohol.

12. A method as claimed in claim 1 wherein said first liquid is conventional water and alcohol windshield washer fluid and said second liquid comprises hexyl alcohol.

13. A method as claimed in claim 12, wherein said second liquid comprising hexyl alcohol is colored by a dye, said dye being generally soluble in said second liquid and generally insoluble in said conventional windshield washer fluid.

14. A windshield washer fluid mixture comprising a conventional water or water and alcohol windshield washer fluid as a first liquid and a second liquid floating above the first liquid, said second liquid having a specific gravity lower than said first liquid and a color noticeably different from said first liquid.

15. A windshield washer fluid mixture as claimed in claim 14 wherein said second liquid is an organic liquid that is not completely miscible with said first liquid.

16. A fluid mixture as claimed in claim 15 wherein said second liquid comprises hexyl alcohol and a dye.

17. A fluid mixture as claimed in claim 15 wherein said second liquid is colored by a dye to a color noticeably different from the color of said first liquid.

18. A windshield washer fluid as claimed in claim 14 wherein said second liquid comprises hexyl alcohol.

19. A windshield washer fluid as claimed in claim 18 wherein said second liquid comprising hexyl alcohol is colored by a dye, said dye being generally soluble in said second liquid and generally insoluble in said conventional windshield washer fluid.

* * * * *